Patented June 19, 1934

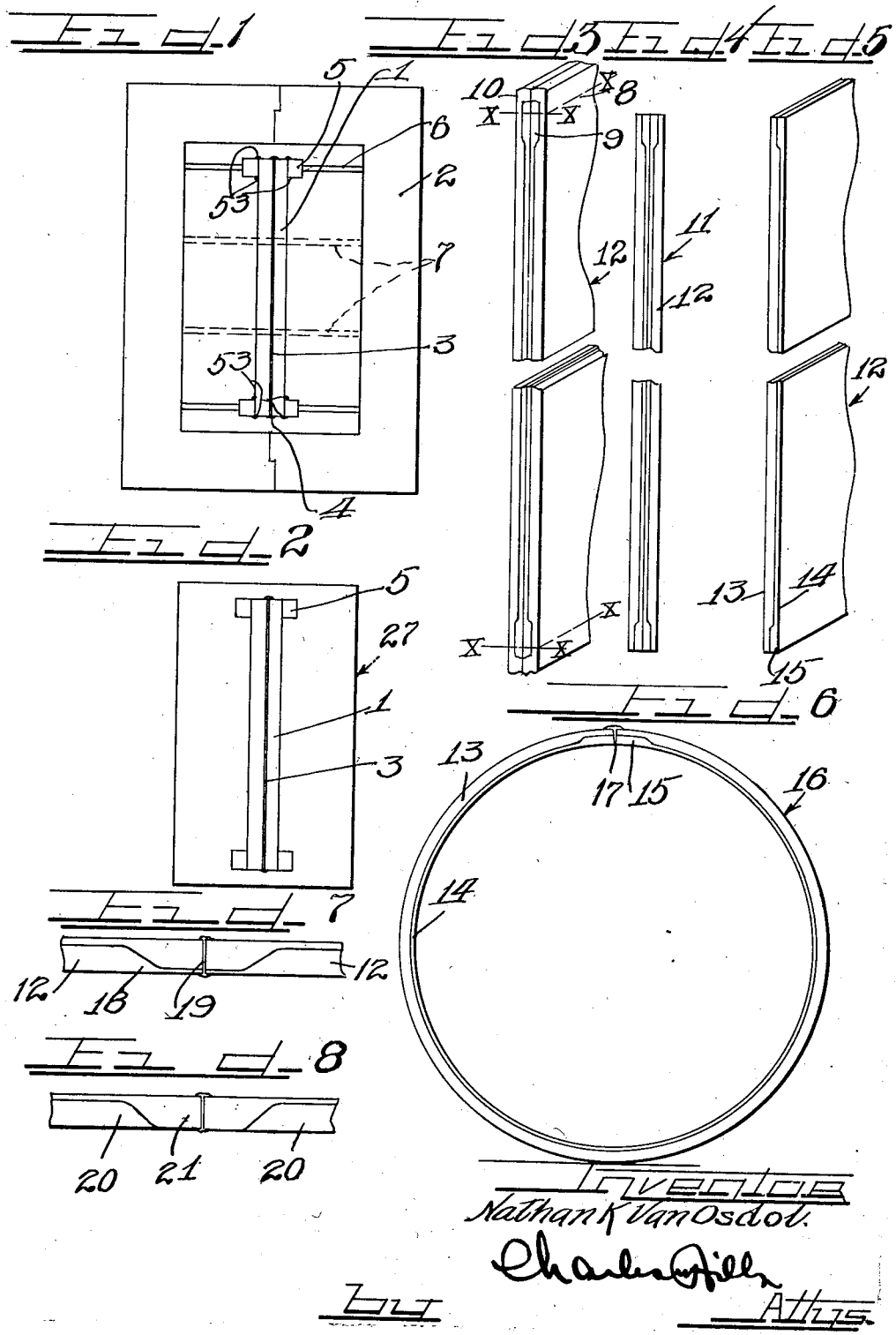

1,963,946

UNITED STATES PATENT OFFICE 1,963,946

METHOD OF MAKING COMPOSITE METAL MEMBERS

Nathan K. Van Osdol, Chicago, Ill., assignor to Borg-Warner Corporation, Chicago, Ill., a corporation of Illinois Application June 29, 1932, Serial No. 619,876

2 Claims. (Cl. 29—188)

This invention relates to a method of making composite metal articles and particularly to a method of making laminated steel tubes or sheets.

The purpose of this invention is to provide a method of making steel tubing or sheet material having a corrosion resistant surface. According to this invention, two slabs of a corrosion resistant metal or metal alloy, each of which has a smoothed, cleaned or otherwise prepared surface, are placed together with such prepared surfaces in juxtaposed relation but separated by a medium that prevents permanent or substantial welding of said surfaces in the subsequent operations. The double slab is then placed on edge in a mold and four pieces or rods of the same metal or similar metal or alloy are placed at the sides of the slab, one piece along each vertical end edge thereof. Another metal is then poured into the mold to completely surround and cover the slab and end pieces.

The composite ingot thus formed is removed from the mold and subjected to a hot rolling operation which completely welds the cast metal to the metal slabs and end pieces and welds the latter to the slabs. The rolling operation naturally increases the area of the ingot in forming a composite slab. The composite slab is then sheared at its ends and split along the prepared surfaces. Each of the individual slabs thus formed may be shaped about a cylindrical member or otherwise rolled to form a tube with the prepared surface inner-most, the ends having a thickened portion of the inner metal, being brought into abutting relation and welded. Similarly a number of the slabs may be buttwelded to form a larger metal sheet.

It is an object of this invention to provide an expedient method of forming a composite metal tube.

It is a further object of this invention to provide a method of forming a metal member having a protective metal surface.

It is a still further object of this invention to provide a method of forming a metal tube having a protective lining wherein the joint is also protected.

It is a particular object of this invention to provide a composite slab by welding two dissimilar metals in such a manner that the end portions of one of the metals are enlarged.

It is a further particular object of this invention to provide a method of forming a tube having a corrosion resistant lining in which the ends of the lining forming the seam of the tubing are enlarged to give added protection in the finished tube.

Other and further objects of this invention will be apparent from the following description and appended claims.

This invention (in a preferred form) is illustrated in the accompanying drawing and hereinafter more fully described.

On the drawing:

Figure 1 is a plan view of a mold showing two metal slabs and four rods therein used for forming a tube according to my invention.

Figure 2 is a plan view of a composite ingot removed from the mold.

Figure 3 is a fragmentary perspective view of a form or slab rolled from the ingot of Figure 2.

Figure 4 is an end elevational view showing the rolled form of Figure 3 with its top and bottom ends removed.

Figure 5 is a fragmentary perspective view of a single sheet of composite metal.

Figure 6 is an end elevation of a tube formed from the sheet of Figure 5.

Figure 7 is a fragmentary end elevational view of a pair of slabs welded end to end to form a plate.

Figure 8 is a view similar to Figure 7 showing a modification of the invention.

As shown on the drawing:

In carrying out this invention, two slabs 1 of metal are provided and are placed in juxtaposition in a mold 2 as shown in Figure 1. The slabs 1 are preferably made of corrosion and heat resisting alloys.

The preferable material for the slab 1 is a stainless steel containing 18% chromium and 8% nickel. Steels having 25% chromium and 12% nickel, and 20% chromium and 10% nickel have also proved satisfactory. In general, steels having from 10 to 30% chromium and 0 to 15% nickel may be used.

Before the slabs are placed in the mold, the surfaces which are to be in opposed relationship are cleaned and prepared, as for instance, by pickling, and if desired by polishing. The prepared surfaces are then coated with a separating composition 3 which may suitably be composed of red lead and sodium silicate (water glass). The proportions by volume of this mixture preferably are as follows:

| | Parts |
|---|---|
| Sodium silicate | 200 |
| Red lead | 300 |
| Water | 50 |

While this composition has been found to give best results, compositions comprising silicate of soda (water glass) and powdered mica, or borax alone have also been used with success. In applying the separating composition, the paste formed by mixing the sodium silicate, red lead, and water is painted on the prepared surfaces of the metal slabs. The material should fully cover the juxtaposed surfaces leaving no uncoated spaces.

The slabs 1, coated as above, are placed together with their prepared surfaces in adjacent position. The adjacent edges of the slabs 1 are welded, as shown at 4, to hold the slabs in place and to prevent the fluid metal which is later poured around the slab from flowing between such surfaces and to give protection against atmosphere and furnace gases during the subsequent operation on the slab.

After the welded slabs 1 are placed in the mold 2, bars 5 of metal similar to the metal of slabs 1 are placed in the molds adjacent the slabs. The size of the bars 5 depends upon the desired thickness of the end enlargements to be formed as later described. It is desirable in some cases to have the bars 5 extend from the slabs to the inner walls of the mold. The bars are four in number, two being placed on each side of the welded slab, one along each end edge thereof. The lines of jointure of the bars and slabs are preferably welded as indicated at 5$^a$ to prevent the ingress of molten metal and hot gases between the juxtaposed surfaces. The mold 2 may be of any suitable material and should be of sufficient size so that the metal to be poured will entirely surround and cover the slabs 1. The mold may be provided with a number of bridges 6 preferably made of metal of the same composition as that being poured. These bridges 6 extend inwardly from the side of the mold and tend to hold the bars 5 against the slabs 1 and also to hold the bars and slabs in upright position. Other bars or bridges 7 extend across the bottom of the mold from wall to wall to support the slab in spaced relation with respect to the bottom of the mold. The slabs of metal are so placed in the mold that their upper edges are below the upper rim of the mold so that the metal may be allowed to flow over the top of the slabs and are also so arranged that the metal flows under the slabs in the mold.

The metal which is to be united to the stainless steel, and which is preferably a steel capable of being heat treated is heated to a molten state and poured into the mold to the top of the slabs. The metals are allowed to cool, and the composite ingot 7 thus formed is then removed from the mold and again heated to welding temperature. The composite ingot 7 is hot passed one or more times through rolls to spread it out into the composite sheet illustrated at 8 in Figure 3. The metal of the rod 5 has by this time become incorporated with the metal of the slab 1 and forms the enlargement illustrated at 9.

After this, the marginal edges 10 are clipped along the line X—X of Figure 3. The metal at this stage of the process is illustrated as the multi-ply sheet 11 of Figure 4. However, the plies 12 of the sheet 11 may be easily separated, in fact rolling strain may cause them to pop apart after the margins have been sheared so as to form the individual sheet 12 of Figure 5. The sheet 12 is composed of an exposed layer of stainless steel or similar metal 14 and a layer of backing metal 13. The layer 14 has the thickened end 15 which displaces part of the layer 13 so that the sheet 12 has a uniform thickness throughout. The separating composition is almost completely dissipated in the rolling process and may be easily cleaned off the surface of the metal. However, frequently it is not even necessary to brush this composition from the surface of the metal.

The composite sheet 12 thus formed is again heated and shaped to form the tube 16 of Figure 6. The edges having the thickened portion 15 are brought into abutting position and welded as shown at 17.

The layer 13 thus forms the lining of the tube and due to its being thickened at the seam the edges can always be easily brought into contact with each other without danger of the outer metal contacting anything within the tube. The lining is practically as good as in the case of a seamless tube.

As shown in Figure 7, the sheets 12 may be welded end to end to form a larger sheet or plate 18. The sheets 12 may be curved as before and a number of them welded together to form a cylinder or similarly shaped member.

The weld between the sheets is illustrated at 19. The weld is between the enlarged ends of the protecting layer.

Figure 8 illustrates a modification of the invention wherein the protecting layer is enlarged at the end of the slab to such an extent that it occupies the whole end portion as shown at 21. In Figure 8, two such slabs 20 are shown welded end to end, but it will be understood that they may be shaped so that the ends of each piece can be brought together and welded.

In each case, the welding is preferably done by the electric arc process, a weld rod of stainless steel being used. At welding temperature, the metals are molten and turbulent. There is a slight absorption of the carbon of the mild steel into the stainless steel but due to greater percentage of the stainless steel at the weld this has no effect on the metal.

This invention has found practical application in the manufacture of metal tubes, plates and similar members and the surface produced on such members has been impervious to the attack of heat, and other corroding agents.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In the manufacture of tubes from plates of a composite metal adapted to be bent to form a tube having integral seam flanges of stainless steel and having an inner surface of stainless steel, the steps which comprise positioning a pair of flat slabs of stainless steel with surfaces in juxtaposed relation and with a separating and non-bonding composition between the juxtaposed surfaces, connecting transversely extending flanges of stainless steel at the upper and lower ends of said slabs, casting a metal about the assembled slabs and flanges to envelop the assembly, rolling the ingot thus formed, cutting the skelp, separating the pair of composite slabs, and then bending one of said slabs into tubular form with an inner surface of stainless steel.

2. In the manufacture of a composite metal tube having an inner and an outer metal and having integral flanges formed of the inner metal, the steps which comprise integrally connecting transversely extending bars of a given metal to a face of a slab of the same metal and at the ends of the slab, welding a backing of another metal to the assembled slab and bars, and then bending the composite slab thus formed into tubular form with the backing metal forming the outer metal of the tube.

NATHAN K. VAN OSDOL.